United States Patent
Aoyama et al.

(10) Patent No.: US 9,114,653 B2
(45) Date of Patent: Aug. 25, 2015

(54) IMAGE RECORDING METHOD

(71) Applicant: Seiko Epson Corporation, Tokyo (JP)

(72) Inventors: Tetsuya Aoyama, Shiojiri (JP); Akiko Kawase, Matsumoto (JP); Ippei Okuda, Shiojiri (JP); Takeshi Yano, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/579,082

(22) Filed: Dec. 22, 2014

(65) Prior Publication Data

US 2015/0174939 A1    Jun. 25, 2015

(30) Foreign Application Priority Data

Dec. 25, 2013 (JP) ................. 2013-266916
Jul. 11, 2014 (JP) ................. 2014-143104

(51) Int. Cl.
*B41J 2/01* (2006.01)
*B41M 7/00* (2006.01)

(52) U.S. Cl.
CPC ................. *B41M 7/0018* (2013.01)

(58) Field of Classification Search
CPC ........ B41J 11/0015; B41J 2/01; B41J 2/2114; B41M 5/50; B41M 5/0047
See application file for complete search history.

(56) References Cited

U.S. PATENT DOCUMENTS

| | | | |
|---|---|---|---|
| 6,979,480 B1 * | 12/2005 | Schulz et al. | 428/32.17 |
| 7,832,658 B2 * | 11/2010 | Kaneko et al. | 239/102.2 |
| 7,976,146 B2 * | 7/2011 | Sanada et al. | 347/100 |
| 8,727,524 B2 * | 5/2014 | Ohmoto | 347/100 |
| 2009/0226632 A1 | 9/2009 | Oberski et al. | |
| 2013/0202861 A1 | 8/2013 | Ohta | |

FOREIGN PATENT DOCUMENTS

| | | |
|---|---|---|
| EP | 1041126 A2 | 10/2000 |
| EP | 2617577 A1 | 7/2013 |
| JP | 2010-023265 A | 2/2010 |
| JP | 2010-023266 A | 2/2010 |
| JP | 2013-006308 A | 1/2013 |
| JP | 2013-146925 A | 8/2013 |

OTHER PUBLICATIONS

Extended Search Report for European Patent Application No. 14199846.8 mailed May 11, 2015 (7 pages).

* cited by examiner

*Primary Examiner* — Lamson Nguyen
(74) *Attorney, Agent, or Firm* — Harness, Dickey & Pierce, P.L.C.

(57) ABSTRACT

There is provided an image recording method including modifying a surface to set a wetting tension index of a recording surface to 40 mN/m or more by carrying out a surface modification of the recording surface of an ink low-absorbing or non-absorbing recording medium, adhering a reaction liquid containing a flocculant to the recording surface after the modifying of the surface, and recording an image on the recording surface using an ink composition for ink jet recording containing a color material and water after the adhering of the reaction liquid.

11 Claims, 1 Drawing Sheet

IMAGE RECORDING METHOD

BACKGROUND

1. Technical Field

The present invention relates to an image recording method.

2. Related Art

In the related art, an ink jet recording method in which minute ink droplets from nozzles of a recording head in an ink jet recording apparatus are ejected to record an image on a recording medium is known. In recent years, the ink jet recording method has become to be used not only for recording an image to a recording medium excellent in absorbability of an ink (for example, a plain paper or the like), but also for recording an image to an ink low-absorbing recording medium (for example, an art paper, a coat paper, or the like) or an ink non-absorbing recording medium (for example, a plastic film or the like). For an ink composition used for recording an image to such an ink low-absorbing or non-absorbing recording medium, an aqueous ink composition using water as a base is attracting attention, from the viewpoint of a global environment, safety, or the like.

However, the aqueous ink composition is easily repelled on the ink low-absorbing or non-absorbing recording medium in comparison with a non-aqueous ink composition using an organic solvent as base. Therefore, there are some cases where it is difficult to obtain a good image since an image can not formed or color unevenness of a recorded image or the like occurs.

As a method for solving such problems, in JP-A-2013-6308, the fact that before an image is formed on a sheet (recording medium) in an image forming apparatus such as an ink jet recording apparatus, a surface modification of the recording medium by using a corona treatment apparatus or a plasma treatment apparatus is carried out is disclosed. In addition, in JP-A-2013-146925, the fact that the ink composition ejected from an ink jet recording head is adhered on a recording surface including polyolefin which is subjected to a corona treatment or a plasma treatment to record an image is disclosed. Thereby, it is possible to improve wet spreading properties or fixing properties of the ink composition adhered on the recording surface.

In addition, as a method of solving the above-described problem by using a method other than a corona treatment or a plasma treatment, in JP-A-2010-23265 or JP-A-2010-23266, the fact that a high-quality recording image free from bleeding, color bleed, printing unevenness, or the like, and excellent in abrasion resistance can be recorded by reacting a reaction liquid containing a multivalent metal salt or the like with the aqueous (water-based) ink composition on a water low-absorbing recording medium is disclosed.

However, even if the surface treatment of the recording medium is carried out by using a corona treatment or the like as described in JP-A-2013-6308 or JPA-2013-146925 described above, there are some cases where it is difficult to record the image with a sufficient image quality such that wetting spread (line width) or the abrasion resistance of the image recorded using the ink composition is insufficient, printing unevenness occurs, or the like.

In addition, in a case where the image is recorded using the ink composition after the reaction liquid as described in JP-A-2010-23265 or JP-A-2010-23266 described above is applied onto the recording medium, there are some cases where it is difficult to record the image with a sufficient image quality such that wetting spread (line width) or the abrasion resistance of the image is insufficient, printing unevenness occurs, or the like since the reaction liquid itself is repelled on the recording medium.

SUMMARY

An advantage of some aspects of the invention is to provide an image recording method which is excellent in wetting spread properties and abrasion resistance with respect to an ink low-absorbing or non-absorbing recording medium and in which the occurrence of printing unevenness is suppressed.

The invention can be realized in the following forms or application examples.

Application Example 1

According to this application example, there is provided an image recording method including modifying a surface to set a wetting tension index of a recording surface to 40 mN/m or more by carrying out a surface modification of the recording surface of an ink low-absorbing or non-absorbing recording medium, adhering a reaction liquid containing a flocculant to the recording surface after the modifying of the surface, and recording an image on the recording surface using an ink composition for ink jet recording containing a color material and water after the adhering of the reaction liquid.

Application Example 2

In the image recording method according to Application Example 1, the surface modification of the recording surface in the modifying of the surface may be carried out by at least one of performing a corona treatment on the recording surface and adhering a resin liquid containing a resin to the recording surface.

Application Example 3

In the image recording method according to Application Example 2, a surface modification of the recording surface in the modifying of the surface may be conducted by carrying out the performing of the corona treatment and the adhering of the resin liquid in this order.

Application Example 4

In the image recording method according to any one of Application Examples 1 to 3, the adhering of the reaction liquid may be conducted within 10 days after the modifying of the surface is carried out.

Application Example 5

In the image recording method according to any one of Application Examples 1 to 4, the flocculant included in the reaction liquid may be at least one kind selected from a multivalent metal salt and an organic acid.

Application Example 6

In the image recording method according to any one of Application Examples 1 to 5, the color material included in the ink composition may be a pigment and the ink composition may further contain a resin dispersant which disperses the pigment.

Application Example 7

In the image recording method according to Application Example 2 or 3, the resin included in the resin liquid may include a resin in which the glass transition temperature is 50° C. or lower.

Application Example 8

In the image recording method according to Application Example 2 or 3, the resin included in the resin liquid may include at least one kind selected from a group consisting of a urethane resin, a (meth)acrylic resin, a styrene-(meth) acrylic resin, and a polyolefin resin.

Application Example 9

In the image recording method according to any one of Application Examples 1 to 8, the recording medium may be an ink non-absorbing recording medium.

Application Example 10

In the image recording method according to any one of Application Examples 1 to 9, the recording of the image may be carried out using an ink jet recording apparatus provided with a recording head which ejects liquid droplets of the ink composition and the ink jet recording apparatus may be an ink jet recording apparatus provided with a line type recording head for carrying out recording of an image by carrying out scanning once in which the ink composition is ejected while the recording head relatively moves with respect to the recording medium.

Application Example 11

In the image recording method according to Application Example 10, in scanning in which the ink composition is ejected while the recording head relatively moves with respect to the recording medium, a relative moving speed of the recording head to the recording medium may be 5 m/minute or more.

BRIEF DESCRIPTION OF THE DRAWING

The invention will be described with reference to the accompanying drawing, wherein like numbers reference like elements.

DESCRIPTION OF EXEMPLARY EMBODIMENTS

Hereinafter, description will be given of favorable embodiments of the invention. The embodiment described below describes one example of the invention. In addition, the invention is not limited to the below embodiments and also includes various types of modification examples conducted in a range not changing the gist of the invention.

1. IMAGE RECORDING METHOD

An image recording method according to an embodiment of the invention includes a surface modifying process to set a wetting tension index of the recording surface to 40 mN/m or more by carrying out a surface modification of a recording surface of an ink low-absorbing or non-absorbing recording medium, a reaction liquid adhering process of adhering a reaction liquid containing a flocculant to the recording surface after the surface modifying process, and an image recording process of recording an image on the recording surface using an ink composition for ink jet recording containing a color material and water after the reaction liquid adhering process.

In the invention, an "image" indicates a recording pattern formed from a dot group and also includes a text print and a solid image. Moreover, a "solid image" means an image pattern which should be an image such that dots are recorded with respect to all pixels which are minimum recording unit regions specified with a recording resolution, a recording region of a recording medium is usually covered by an ink, and a foundation of the recording medium can not be seen.

Hereinafter, description will be given of an image recording method according to the embodiment for each process in detail.

1.1. Surface Modifying Process

A surface modifying process is a process of to set a wetting tension index of a recording surface to 40 mN/m or more by carrying out a surface modification of the recording surface of an ink low-absorbing or non-absorbing recording medium. Therefore, since it is possible to improve wetting spread properties of the reaction liquid, it is possible to uniformly adhere the reaction liquid onto the recording medium.

In the surface modifying process, it is necessary to set a wetting tension index of the recording surface to mN/m or more, however, the wetting tension index is preferably from 40 mN/m to 73 mN/m, more preferably from 45 mN/m to 73 mN/m, and further more preferably from 50 mN/m to 73 mN/m. When the wetting tension index is set to 40 mN/m or more, wettability of the reaction liquid to the recording surface is improved and thus adhesion properties to the recording surface become good. In addition, when the wetting tension index is set to 73 mN/m or less, it is possible to reduce damage to the recording surface caused by the surface modifying process, and thus it is possible to prolong the lifetime of the recording medium. On the other hand, when the wetting tension index becomes less than 40 mN/m, the reaction liquid is repelled on the recording surface, afterwards, troubles such that printing unevenness occurs on the image recorded using the ink composition or a line width is not sufficient occur, and thus the image quality of the image which is recorded is degraded.

The "wetting tension index" in the invention means a wetting tension measured in accordance with "Plastics-Film and Sheeting-Test Method of Wetting Tension (JIS K6768: 1999)".

As to the surface modification of the recording surface in the surface modifying process, if it is possible to set the wetting tension index of the recording surface to 40 mN/m or more, any treatment method may be used and, for example, a corona treatment, an atmospheric pressure plasma treatment, a flame treatment, an ultraviolet irradiation treatment, a solvent treatment, an adhesion treatment of a resin liquid (for example, a primer treatment), or the like are included. These treatment methods can be conducted by using a well-known apparatus.

Among the treatment methods described above, it is preferable that the surface modification of the recording surface be carried out by at least one of a corona treatment process in which the recording surface is subjected to a corona treatment and a resin liquid adhering process of adhering a resin liquid (described below) containing a resin to the recording surface.

The corona treatment is preferably used since the output stability of corona discharge is excellent and the surface treatment can be uniformly carried out with respect to the recording surface in comparison with an atmospheric pressure plasma treatment, a flame treatment, and an ultraviolet irradiation treatment. In addition, the adhesion treatment of the resin liquid is preferably used from the point in which an effect of enhancing the wetting tension index of the recording surface is high in comparison with other treatments described above and an effect of enhancing adhesion properties of the image due to the resin is excellent.

In particular, among the treatment methods described above, it is more preferable that the surface modification of the recording surface be conducted by carrying out the corona treatment process and a resin liquid adhering process in this order. Since the adhesion properties of the resin liquid to the recording surface is enhanced by carrying out the corona treatment in advance before the resin liquid adhering process, adhesion properties and the abrasion resistance of the image which is recorded are further enhanced.

Various kinds of conditions (discharge amount or the like) in a case of carrying out the corona treatment process can be appropriately set so that the wetting tension index of the recording surface becomes 40 mN/m or more when the surface modifying process is conducted and there is no particular limitation.

In a case where the application of the resin liquid is carried out, the application amount of the resin liquid can be appropriately set so that the wetting tension index of the recording surface becomes 40 mN/m or more when the surface modifying process is conducted and there is no particular limitation, however, for example, the application amount of the resin (solid content) of the resin liquid can be set to 0.01 g/m$^2$ or more, and furthermore, can be set from 0.05 g/m$^2$ to 1.0 g/m$^2$. When the application amount of the resin is set to 0.01 g/m$^2$ or more, there are some cases where the surface modifying effect is further improved, and when the application amount of the resin is set to 1.0 g/m$^2$ or less, there are some cases where drying properties of the resin can be enhanced.

Furthermore, the application amount of the resin (solid content) is preferably 0.5 g/m$^2$ or less, more preferably 0.3 g/m$^2$ or less, and further more preferably 0.25 g/m$^2$ or less, in terms of further enhancing drying properties of the resin while ensuring the surface modifying effect. In addition, it is preferable that the application amount of the resin be set to 0.1 g/m$^2$ or more, in terms of making the surface modifying effect more excellent. The adhesion amount described above is applied in a region of carrying out the reaction liquid adhering process and the image recording process described below.

As a method of adhering the resin in a resin liquid adhering process, for example, various kinds of methods such as a spin coating, dip coating, spray coating, gravure roll coating, reverse roll coating, bar coating, or ink jet method can be used and it is possible to appropriately select a method in consideration of the adhesion amount of the resin liquid, the size of the recording medium, the apparatus configuration, or the like.

In a case where the resin liquid adhering process is carried out, a process of drying a resin liquid may be provided after the resin liquid adhering process has been carried out and before the reaction liquid adhering process. In this case, it is preferable that the drying be carried out up to a degree whereby a sticky feeling is not felt when touching the resin liquid which is adhered to the recording medium. The drying process of a resin liquid may be carried out through natural drying, however, may be drying by heat, from the viewpoint of enhancing the drying speed or promoting the fusion to the recording medium of the resin included in the resin liquid. In a case where the drying process of a resin liquid is drying by heat, the heating method thereof is not particularly limited, however, for example, a heat press method, a normal pressure steam method, a high pressure steam method, and a thermal fixing method are included. In addition, as a heat source for heating, for example, an infrared ray (lamp) is included.

The ink low-absorbing or non-absorbing recording medium indicates a recording medium having properties of not absorbing at all or hardly absorbing the ink composition. Quantitatively, the ink non-absorbing or low-absorbing recording medium indicates "a recording medium in which the amount of water absorption from the start of contact to 30 msec$^{1/2}$ is 10 mL/m$^2$ or less in the Bristow method". The Bristow method is the most common method as a measurement method of the amount of liquid absorption for a short time and is also employed in the Japan Technical Association of the Pulp and Paper Industry (JAPAN TAPPI). The details of the test method are described in the standard No. 51 "Paper and board-the liquid absorbability test method-the Bristow method" in "the JAPAN TAPPI paper and pulp test method in the 2000 version". In contrast, an ink absorbing recording medium indicates a recording medium that does not fall under the ink non-absorbing properties and low-absorbing properties.

As an ink non-absorbing recording medium, for example, a plastic film which does not have an ink absorbing layer, one in which plastic is coated on a substrate such as paper, one in which a plastic film is bonded, and the like are included. As plastic mentioned here, polyvinyl chloride, polyethylene terephthalate, polycarbonate, polystyrene, polyurethane, polyethylene, polypropylene, and the like are included.

In addition, as an ink low-absorbing recording medium, the recording medium provided with a coating layer for receiving an ink on the surface is included and, for example, actual printing paper such as art paper, coat paper, or mat paper is included as a recording medium in which the substrate is paper and in a case where the substrate is a plastic film, one in which a hydrophilic polymer is coated on the surface of polyvinyl chloride, polyethylene terephthalate, polycarbonate, polystyrene, polyurethane, polyethylene, polypropylene, or the like and one in which particles of silica, titanium, or the like are coated together with a binder are included.

The ink non-absorbing recording medium easily repels the reaction liquid or the ink composition more than the ink low-absorbing recording medium. Therefore, when the ink non-absorbing recording medium is used, an effect (effect of improvement of wetting spread properties of ink and printing unevenness, or the like) obtained by the invention is further prominently exhibited.

1.2. Reaction Liquid Adhering Process

The reaction liquid adhering process is a process of adhering the reaction liquid (described below) containing the flocculant to the recording surface after the surface modifying process described above. The flocculant has a function of flocculating the color material by reacting with the color material included in the ink composition (described below), the resin which can be included in the ink composition, or the resin dispersant. Thereby, it is possible to suppress the occurrence of printing unevenness of the image recorded by the ink composition or the like, and thus the image excellent in image quality is obtained.

As a method of adhering the reaction liquid, for example, any method such as a spin coating, spray coating, gravure roll coating, reverse roll coating, bar coating, or ink jet method can be used.

The adhesion amount of the flocculant in the reaction liquid is preferably from 0.01 g/m$^2$ to 2.0 g/m$^2$ and more preferably from 0.02 g/m$^2$ to 1.6 g/m$^2$. When the adhesion amount is 0.01 g/m$^2$ or more, the color material or the resin component becomes further easy to flocculate. In addition, when the adhesion amount is 2.0 g/m$^2$ or less, it is possible to shorten a drying time of the reaction liquid, and thus it is possible to attain the speeding up of recording.

Furthermore, it is more preferable that the adhesion amount be 0.03 g/m$^2$ or more in terms of being more excellent in flocculation of the color material or the resin component. In addition, the adhesion amount is more preferably 1.0 g/m$^2$ or less, still more preferably 0.5 g/m$^2$ or less, particularly preferably 0.2 g/m$^2$ or less, and further more preferably 0.1 g/m$^2$ or less, in terms of being more excellent in drying time of the reaction liquid while ensuring an effect of flocculating the color material or the resin component, furthermore, in terms of reducing stickiness or odor of a recorded matter caused by the flocculant.

The adhesion amount described above is applied in a region on the recording medium on which the surface modifying process described above and the image recording process described below are carried out. In particular, by carrying out the surface modifying process described above, it is possible to make the flocculation of the color material and the resin component excellent even in a case where the adhesion amount in the reaction liquid adhering process is set to the adhesion amount described above.

In addition, in a case of having a plurality of adhering regions in which the adhesion amount of the flocculant in the reaction liquid adhering process are different, setting to an adhesion amount in a region in which the adhesion amount of the flocculant is the largest is preferable in terms of being more excellent in the above point.

Drying process of a reaction liquid may be provided after the reaction liquid adhering process and before the image recording process. In this case, it is preferable that the drying be carried out up to a degree whereby a sticky feeling is not felt when touching the reaction liquid which is adhered to the recording medium. The drying process of a reaction liquid may be carried out through natural drying, however, may be drying by heat, from the same viewpoint as the fact described in a case where the resin liquid is dried. The heating method of the reaction liquid is not particularly limited, however, the same methods as one included in the heating method of the resin liquid can be used.

The reaction liquid adhering process is preferably carried out within 10 days, is more preferably carried out within 5 days, and is further more preferably carried out within 1 day after the surface modifying process described above, from the viewpoint of easily obtaining the surface modifying effect by the surface modifying process. In particular, in the surface modifying process described above, in a case where the corona treatment process is carried out, since the effect thereof is easily deteriorated owing to diffusing radicals to the inside of the recording medium over time, and thus it is more preferable to carry out the corona treatment process within the above-described period. In addition, in a case of using the ink low-absorbing recording medium as a recording medium and carrying out the resin liquid adhering process in the surface modifying process, the surface modifying effect is hardly deteriorated in comparison with the corona treatment process, however, the resin liquid is permeated inside the ink low-absorbing recording medium and the effect thereof is sometimes deteriorated, and thus it is preferable that the corona treatment process be carried out within the above-described period.

1.3. Image Recording Process

The image recording process is a process of recording an image on the recording surface of the recording medium using the ink composition for ink jet recording containing the color material and water after the reaction liquid adhering process described above. Thereby, since the color material is flocculated on the recording surface by reacting the color material or the like included in the ink composition with the flocculant, it is possible to enhance coloring properties or the like of the image which is recorded. Furthermore, since the ink composition is adhered to the recording surface onto which the reaction liquid is uniformly applied, the reaction with the flocculant is uniformly carried out regardless of the position at which the ink composition is adhered. Thereby, it is possible to excellently suppress the occurrence of printing unevenness or the like of the image which is recorded.

"Printing unevenness" in the specification means a phenomenon in which color unevenness is observed in an image which is recorded by occurring a color difference between liquid droplets or occurring a filling failure of the image due to liquid droplets repelled on the recording medium when liquid droplets of the same ink composition are adhered on the recording medium.

The image recording process is to record the image on the recording surface by ejecting liquid droplets of the ink composition from the nozzles of an ink jet recording head to adhere the ink composition to the recording surface of the recording medium described above. Thereby, a recorded matter in which the image consisting of the ink composition is recorded on the recording surface of the recording medium is obtained.

The adhesion amount (as a composition) of the ink composition in the image recording process is preferably from 0.01 g/m$^2$ to 25 g/m$^2$ in terms of being capable of imparting a desired color to the recorded matter or reducing the used amount of the ink composition while making the image quality of the recorded matter more excellent, and the upper limit is more preferably 20 g/m$^2$ or less, still more preferably 15 g/m$^2$ or less, and further more preferably 10 g/m$^2$ or less. The adhesion amount described above is applied in a region of the recording medium in which the surface modifying process and the reaction liquid adhering process described above are carried out.

Drying process of an image which is recorded on the recording surface may be provided after the image recording process. In this case, it is preferable that the drying be carried out up to a degree whereby a sticky feeling is not felt when touching the image which is adhered to the recording medium. The drying process of an image may be carried out through natural drying, however, may be drying by heat, from the same viewpoint as the fact described in a case where the resin liquid is dried. The heating method of the image is not particularly limited, however, the same methods as ones included in the heating method of the resin liquid can be used.

2. RESIN LIQUID, REACTION LIQUID, AND INK COMPOSITION 2.1. Resin Liquid

In the image recording method according to the embodiment, in a case where the resin liquid adhering process is conducted as the surface modifying process, the resin liquid is used. Hereinafter, description will be given of components which are included and components which can be included in a resin liquid used in the resin liquid adhering process in detail.

2.1.1. Resin

The resin liquid used in the resin liquid adhering process contains a resin. The resin is provided with a function of making the abrasion resistance excellent or the like by decreasing the surface tension of the recording surface of the recording medium or enhancing adhesion properties of the image which is recorded on the recording surface.

As a resin included in the resin liquid, for example, well-known resins such as an urethane-based resin, an acrylic-based resin, a styrene acrylic-based resin, a fluorene-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, or an ethylene vinyl acetate-based resin are included. These resins can be used as one kind alone or in combination of two or more kinds thereof.

Among the resins described above, it is preferable that the resin included in the resin liquid according to the embodiment include an urethane-based resin, an acrylic-based resin, a styrene acrylic-based resin, or a polyolefin-based resin. When these resins are used, there is a tendency in which an effect of decreasing the surface tension of the recording surface of the recording medium or an effect of enhancing adhesion properties of the image becomes more excellent.

An urethane-based resin is a general term for a resin having an urethane bond. As an urethane-based resin, a polyether type urethane resin including an ether bond in its main chain, a polyester type urethane resin including an ester bond in its main chain, a polycarbonate type urethane resin including a carbonate bond in its main chain, and the like can be used in addition to an urethane bond. As an urethane-based resin, commercial products may be used and, for example, commercial products such as Superflex 460, 460S, 840, and E-4000 (trade name, manufactured by DAI-ICHI KOGYO SEIYAKU CO., LTD.), RESAMINE D-1060, D-2020, D-4080, D-4200, D-6300, and D-6455 (trade name, manufactured by Dainichiseika Color & Chemicals Mfg. Co., Ltd.), Takelac WS-6021 and W-512-A-6 (trade name, manufactured by Mitsui Chemicals, Inc.), SANCURE 2710 (trade name, manufactured by Lubrizol Corporation), or PERMARIN UA-150 (trade name, manufactured by Sanyo Chemical Industries, Ltd.) may be used.

An acrylic-based resin is a general term for a polymer obtained by polymerizing at least an acrylic-based monomer such as (meth)acrylic acid or (meth)acrylic acid ester and, for example, a (meth)acrylic resin obtained from an acrylic-based monomer, a copolymer of an acrylic-based monomer and a monomer other than an acrylic-based monomer (for example, acrylamide, acrylonitrile, or the like), and the like are included. As a resin emulsion using an acrylic-based resin as a raw material, commercial products may be used and, for example, FK-854 (trade name, manufactured by CSC CO., LTD.), Mowinyl 952B and 718A (trade name, manufactured by The Nippon Synthetic Chemical Industry Co., Ltd.), Nipol LX852 and LX874 (trade name, manufactured by ZEON CORPORATION), and the like are included.

Moreover, in the specification, an acrylic-based resin does not include a styrene acrylic-based resin described below. In addition, in the specification, (meth)acrylic means both of acrylic and methacrylic.

A styrene acrylic-based resin is a copolymer obtained from a styrene monomer and an acrylic-based monomer, and a styrene-acrylic acid copolymer, a styrene-methacrylic acid copolymer, a styrene-methacrylic acid-acrylic acid ester copolymer, a styrene-a-methylstyrene-acrylic acid copolymer, a styrene-a-methylstyrene-acrylic acid-acrylic acid ester copolymer, and the like are included. As a styrene acrylic-based resin, commercial products may be used and, for example, Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade name, manufactured by BASF Japan Ltd.), Mowinyl 966A and 975N (trade name, manufactured by The Nippon Synthetic Chemical Industry Co., Ltd.), and the like are included.

A polyolefin-based resin is a resin having olefin such as ethylene, propylene, or butylene as a structure skeleton and a well-known one can be appropriately selected to be used. As a polyolefin-based resin, commercial products can be used and, for example, ARROWBASE CB-1200 and CD-1200 (trade name, manufactured by UNITIKA LTD.) and the like are included.

The resin included in the resin liquid preferably includes a resin in which the glass transition temperature (Tg) is 50° C. or lower, more preferably includes a resin in which the Tg is from −80° C. to 50° C., and further more preferably includes a resin in which the Tg is from −80° C. to 40° C. When the resin liquid includes the resin in which the Tg is 50° C. or lower, there are some cases where adhesion properties to the recording medium of the resin liquid become excellent, and when the resin liquid includes the resin in which the Tg is −80° C. or higher, the stickness of the resin liquid adhered to the recording medium is suppressed so as not to increase too high. In addition, when the Tg is room temperature (25° C.) or lower, film-forming properties (film-formation) of the resin become excellent, and thus there are some cases where a process of heating the resin liquid adhered to the recording surface can be omitted. The glass transition temperature of the resin included in the resin liquid can be changed by changing at least one of kinds, configuration ratios, polymerization conditions, modifications of resin of a monomer, a compound having two or more isocyanate groups, a compound having two or more active hydrogen groups, or the like configuring the resin used when the resin is obtained by polymerizing. As polymerization conditions, the temperature at polymerization, the kind of medium containing a monomer, the monomer concentration in a medium, the kind or the used amount of a polymerization initiator or a catalyst used at polymerization, and the like are included. The glass transition temperature can be measured using differential scanning calorimetry (DSC method), based on JIS K7121.

The content (the amount converted as a solid content) of the resin is preferably from 1% by mass to 15% by mass and more preferably from 1% by mass to 10% by mass, with respect to the total mass of the resin liquid. When the content of the resin included in the resin liquid is within the range described above, there is a tendency in which an effect of decreasing the surface tension of the recording surface of the recording medium or an effect of enhancing adhesion properties of the image becomes more excellent.

The resin can be set to a form of being included in the resin liquid as a dispersion such as an emulsion or a form of being included in the resin liquid in a dissolved state. In a case of the dispersion, it is more preferable in terms of the water resistance, the abrasion resistance, or the like of the recorded matter.

2.1.2. Water

The resin liquid according to the embodiment may contain water. Water functions as a main medium of the resin liquid and is a component which is evaporated and scattered by drying. Water is preferably one such as pure water or ultra pure water such as ion exchange water, ultrafiltration water, reverse osmosis water, or distilled water, in which ionic impurities are eliminated as much as possible. In addition, when water which is sterilized by being irradiated with an ultraviolet ray, adding hydrogen peroxide, or the like is used, in a case where the resin liquid is stored for a long period, it is possible to prevent the generation of mold and bacteria, and thus it is suitable.

The content of water included in the resin liquid can be set to, for example, 50% by mass or more and may be set to 60% by mass or more, with respect to the total mass of the resin liquid.

2.1.3. Organic Solvent

The resin liquid according to the embodiment may contain an organic solvent. The organic solvent is provided with a function of enhancing adhesion properties of the resin liquid to the ink low-absorbing or non-absorbing recording medium described above or the like.

The organic solvent is not particularly limited, however, for example, 1,2-alkanediols, polyalcohols, a pyrrolidone derivative, glycol ethers, and the like are included.

As 1,2-alkanediols, for example, 1,2-propanediol, 1,2-butanediol, 1,2-pentanediol, 1,2-hexanediol, 1,2-octanediol, and the like are included. 1,2-alkanediols are excellent in action for uniformly wetting by enhancing wettability of the resin liquid to the recording medium. In a case of containing 1,2-alkanediols, the content thereof can be set from 1% by mass to 20% by mass with respect to the total mass of the resin liquid.

As polyalcohols, for example, ethylene glycol, diethylene glycol, propylene glycol, dipropylene glycol, 1,3-propanediol, 1,4-butanediol, 1,6-hexanediol, trimethylolpropane, glycerin, and the like are included. In a case of containing polyalcohols, the content thereof can be set from 2% by mass to 30% by mass with respect to the total mass of the resin liquid.

As a pyrrolidone derivative, for example, N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like are included. The pyrrolidone derivative can act as an excellent dissolving agent for the resin.

As glycol ethers, for example, ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-ethylhexyl ether, diethylene glycol mono-2-ethylhexyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monomethyl ether, and the like are included. These can be used as one kind alone or by mixing two or more kinds thereof. Glycol ethers can control wettability or the like to the recording medium of the resin liquid.

2.1.4. Surfactant

The resin liquid according to the embodiment may contain a surfactant. The surfactant is provided with a function of decreasing the surface tension and enhancing wettability to the recording medium. Among the surfactants, for example, an acetylene glycol-based surfactant, a silicone-based surfactant, and a fluorine-based surfactant can be preferably used.

The acetylene glycol-based surfactant is not particularly limited, however, for example, Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (hereinbefore, all trade names, manufactured by Air Products and Chemicals. Inc.), OLFINE B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (hereinbefore, all trade names, manufactured by Nissin Chemical Co., Ltd.), and Acetylenol E00, E00P, E40, and E100 (hereinbefore, all trade names, manufactured by Kawaken Fine Chemicals Co., Ltd.) are included.

The silicone-based surfactant is not particularly limited, however, a polysiloxane-based compound is preferably included. The polysiloxane-based compound is not particularly limited, however, for example, a polyether-modified organosiloxane is included. As a commercial product of the polyether-modified organosiloxane, for example, BYK-306, BYK-307, BYK-333, BYK-341, BYK-345, BYK-346, and BYK-348 (hereinbefore, all trade names, manufactured by BYK Japan KK.), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (hereinbefore, all trade names, manufactured by Shin-Etsu Chemical Co., Ltd.) are included.

As a fluorine-based surfactant, it is preferable to use a fluorine-modified polymer and as a specific example, BYK-340 (manufactured by BYK Japan KK.) is included.

In a case of containing the surfactant, the content thereof can be set from 0.1% by mass to 1.5% by mass with respect to the total mass of the resin liquid.

2.1.5. Other Components

The resin liquid according to the embodiment may contain a pH adjusting agent, a preservative and fungicide, a rust inhibitor, a chelating agent, or the like, as necessary.

2.2. Reaction Liquid

In the image recording method according to the embodiment, the reaction liquid is used in the reaction liquid adhering process. Hereinafter, description will be given of components which are included and components which can be included in a reaction liquid in detail.

2.2.1. Flocculant

The reaction liquid according to the embodiment contains a flocculant. The flocculant has a function of flocculating the color material by reacting with the color material included in the ink composition and a pigment dispersion and the resin which can be included in the ink composition. Thereby, it is possible to enhance color properties or the like of the image which is recorded by the ink composition.

The flocculant is not particularly limited, however, a multivalent metal salt, organic acid, a cationic compound, and the like are included, and as a cationic compound, a cationic resin, a cationic surfactant, or the like can be used. Among these flocculants, it is preferable to use at least one kind selected from a multivalent metal salt and organic acid in terms of being excellent in reactivity with the components included in the ink composition.

A multivalent metal compound is not limited to the following, however, for example, a titanium compound, a chromium compound, a copper compound, a cobalt compound, a strontium compound, a barium compound, an iron compound, an aluminum compound, a calcium compound, a magnesium compound, and a salt thereof (multivalent metal salt) are included. Among these multivalent metal compounds, since it is possible to effectively flocculate a pigment, one or more kinds selected from a group consisting of an aluminum compound, a calcium compound, a magnesium compound, and a salt thereof are preferable, a dissociable salt of an alkali earth metal such as calcium or magnesium is more preferable, at least any one of a calcium salt and a magnesium salt is still more preferable, and a calcium salt is further more preferable. Moreover, the multivalent metal compound is preferably an ionic multivalent metal compound. In particular, in a case where the multivalent metal compound is a calcium salt, the stability of the reaction liquid becomes more excellent.

Specific examples of the above-described multivalent metal compound include a inorganic pigment such as calcium carbonate such as heavy calcium carbonate and precipitated calcium carbonate, chalk, kaolin, calcined clay, talc, calcium nitrate, calcium chloride, calcium sulfate, magnesium sulfate, barium sulfate, titanium oxide, zinc calcium silicate, magnesium silicate, synthetic silica, aluminum hydroxide, alumina, sericite, white carbon, saponite, calcium montmorillonite, sodium montmorillonite, and bentonite, and an organic pigment such as an acrylic-based plastic pigment and an urea polymeric substance are included. Among those, at least any one of calcium nitrate and calcium chloride is preferable and calcium nitrate is more preferable, since a sufficient solubility in water can be ensured and marks which remain owing to the reaction liquid are reduced (marks become inconspicuous).

As an organic acid, for example, sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, and a derivative of these compounds, or a salt thereof, and the like are suitably included. The organic acid may be used as one kind alone or may be combined with two or more kinds thereof.

As a cationic resin, for example, a cationic urethane-based resin, a cationic olefin-based resin, a cationic allylamine-based resin, and the like are included.

As a cationic urethane-based resin, it is possible to appropriately select a well-known one to be used. As a cationic urethane-based resin, commercial products can be used and, for example, HYDRAN CP-7010, CP-7020, CP-7030, CP-7040, CP-7050, CP-7060, and CP-7610 (trade name, manufactured by Dainippon Ink And Chemicals, Inc.), Superflex 600, 610, 620, 630, 640, and 650 (trade name, manufactured by DAI-ICHI KOGYO SEIYAKU CO., LTD.), Urethane emulsion WBR-2120C and WBR-2122C (trade name, manufactured by TAISEI FINE CHEMICAL CO., LTD.) or the like can be used.

The cationic olefin resin is a resin having olefin such as ethylene or propylene as a structure skeleton and a well-known one can be appropriately selected to be used. In addition, the cationic olefin resin may be in an emulsion state in which the resin is dispersed in a solvent including water, an organic solvent, or the like. As a cationic olefin resin, commercial products can be used, and, for example, ARROW-BASE CB-1200 and CD-1200 (trade name, manufactured by UNITIKA LTD.) and the like are included.

As a cationic allylamine-based resin, it is possible to appropriately select a well-known one to be used and, for example, polyallylamine hydrochloride, polyallylamine amide sulfate, an allylamine hydrochloride-diallylamine hydrochloride copolymer, an allylamine acetate-diallylamine acetate copolymer, an allylamine hydrochloride-dimethylallylamine hydrochloride copolymer, an allylamine-dimethylallylamine copolymer, polydiallylamine hydrochloride, polymethyldiallylamine hydrochloride, polymethyldiallylamineamide sulfate, polymethyldiallylamine acetate, polydiallyldimethyl ammonium chloride, a diallylamine acetate-sulfur dioxide copolymer, a diallylmethylethyl ammonium ethyl sulfate-sulfur dioxide copolymer, a methyldiallylamine hydrochloride-sulfur dioxide copolymer, a diallyldimethyl ammonium chloride-sulfur dioxide copolymer, a diallyl dimethyl ammonium chloride-acrylamide copolymer, and the like are included. As such a cationic allylamine-based resin, commercial products can be used and, for example, PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (trade name, manufactured by NITTOBO MEDICAL CO., LTD.), Himo Neo-600, Himoloc Q-101, Q-311, and Q-501, and Himax SC-505 and SC-505(trade name, manufactured by HYMO Co., Ltd.), and the like can be used.

As an cationic surfactant, for example, a primary, secondary, and tertiary amine salt type compound, an alkyl amine salt, a dialkyl amine salt, an aliphatic amine salt, a benzalkonium salt, a quaternary ammonium salt, a quaternary alkyl ammonium salt, a alkylpyridinium salt, a sulfonium salt, a phosphonium salt, an onium salt, an imidazolinium salt, and the like are included. Specifically, for example, a hydrochloride, an acetate, or the like of lauryl amine, coconut amine, rosin amine, or the like, lauryl trimethyl ammonium chloride, cetyl trimethyl ammonium chloride, benzyltributyl ammonium chloride, benzalkonium chloride, dimethyl ethyl lauryl ammonium ethyl sulfate, dimethyl ethyl octyl ammonium ethyl sulfate, trimethyl lauryl ammonium hydrochloride, cetyl pyridinium chloride, cetyl pyridinium bromide, dihydroxy ethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, octadecyl dimethyl ammonium chloride, and the like are included.

The content of the flocculant can be appropriately determined so as to exhibit the effects described above, and, for example, the content thereof is preferably from 0.1% by mass to 40% by mass and more preferably from 2% by mass to 25% by mass, with respect to the total mass of the reaction liquid.

2.2.2. Water

The reaction liquid according to the embodiment may contain water. Since water which is preferably used is the same as those described in the resin liquid, description thereof will be omitted. The content of water included in the reaction liquid can be set to, for example, 50% by mass or more with respect to the total mass of the reaction liquid.

2.2.3. Organic Solvent

The reaction liquid according to the embodiment may contain an organic solvent. The organic solvent is provided with a function of enhancing adhesion properties of the resin liquid to the ink low-absorbing or non-absorbing recording medium described above, or the like. As an organic solvent, since the same organic solvents can be used as those exemplified in description of the resin liquid, description thereof will be omitted. The content of the organic solvent is not particularly limited, however, can be set, for example, from 1% by mass to 40% by mass with respect to the total mass of the reaction liquid.

2.2.4. Surfactant

The reaction liquid according to the embodiment may contain a surfactant. The surfactant is provided with a function of decreasing the surface tension of the reaction liquid and enhancing wettability to the recording medium. Among the surfactants, for example, an acetylene glycol-based surfactant, a silicone-based surfactant, and a fluorine-based surfactant can be preferably used. As to specific examples of these surfactants, since the same surfactants can be used as those exemplified in description of the resin liquid, description thereof will be omitted. The content of the surfactant is not particularly limited, however, can be set, for example, from 0.1% by mass to 1.5% by mass with respect to the total mass of the reaction liquid.

2.2.5. Other Components

The reaction liquid according to the embodiment may contain a pH adjusting agent, a preservative and fungicide, a rust inhibitor, a chelating agent, a resin, or the like as necessary.

2.3. Ink Composition

In the image recording method according to the embodiment, the image is formed by using an ink composition for ink jet recording in the image recording process. Hereinafter, description will be given of compositions which are included or compositions which can be included in an ink composition used in image recording process in detail.

2.3.1. Color Material

The ink composition according to the embodiment contains a color material. As a color material, a pigment and an acid dye can be preferably used from the viewpoint of being excellent in reactivity with the flocculant included in the reaction liquid described above.

Among pigments, as an inorganic pigment, for example, carbon black, iron oxide, and titanium oxide are included. The carbon black described above is not particularly limited, however, for example, furnace black, lamp black, acetylene black, and channel black (C.I. Pigment Black 7) are included. In addition, as a commercial product of carbon black, for example, No. 2300, 900, MCF88, No. 20B, No. 33, No. 40, No. 45, No. 52, MA7, MA8, MA100, and No. 2200B (hereinbefore, all trade names, manufactured by Mitsubishi Chemical Corporation), Color Black FW1, FW2, FW2V, FW18, FW200, 5150, 5160, and 5170, Printex 35, U, V, and 140U, and Special Black 6, 5, 4A, 4, and 250 (hereinbefore, all trade names, manufactured by Degussa AG), Conductex SC and Raven 1255, 5750, 5250, 5000, 3500, 1255, and 700 (hereinbefore, all trade names, manufactured by Columbian Carbon Japan Ltd.), REGAL 400R, 330R, and 660R, MOGUL L, MONARCH 700, 800, 880, 900, 1000, 1100, 1300, and 1400, and ELFTEX 12 (hereinbefore, all trade names, manufactured by Cabot Corporation) are included.

As an organic pigment, for example, a quinacridone-based pigment, a quinacridonequinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, and an azo-based pigment are included. As a specific example of the organic pigment, the following pigments are included.

As a pigment used in a cyan ink, C.I. Pigment Blue 1, 2, 3, 15, 15:1, 15:2, 15:3, 15:4, 15:6, 15:34, 16, 18, 22, 60, 65, and 66, and C.I. Vat Blue 4 and 60 are included.

As a pigment used in a magenta ink, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, and 264, and C.I. Pigment Violet 19, 23, 32, 33, 36, 38, 43, and 50 are included.

As a pigment used in a yellow ink, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213 are included.

Moreover, as a pigment such as a green ink or an orange ink, which is used in an ink of color other than the above, a well-known one in the related art is included. The pigment may be used as one kind alone or may be used in combination of two or more kinds thereof.

As an acid dye, the acid dye such as azo-based, anthraquinone-based, pyrazolone-based, phthalocyanine-based, xanthene-based, indigoid-based, or triphenylmethane-based is included. As a specific example of the acid dye, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, and the like are included. The dye may be used as one kind alone or may be used in combination of two or more kinds thereof.

2.3.2. Resin Dispersant

In a case where the pigment is used as a color material, in order to apply the pigment to the ink composition, the pigment is preferably set so as to be able to be stably dispersed and held in water. As a method thereof, a method of dispersing by using a resin dispersant such as water-soluble resin and/or water-dispersible resin (hereinafter, a pigment treated by this method is sometimes referred to as a "resin dispersing pigment"), a method of dispersing by using the dispersant (hereinafter, a pigment treated by this method is sometimes referred to as a "dispersant dispersing pigment"), a method of chemically and physically introducing a hydrophilic functional group onto the surface of pigment particles and capable of performing dispersing and/or dissolving in water without the resin or the dispersant described above (hereinafter, a pigment treated by this method is sometimes referred to as a "surface treated pigment"), and the like are included.

As to the ink composition according to the embodiment, any of the resin dispersing pigment, the dispersant dispersing pigment, and the surface treated pigment described above can be used, and these can be used in the form in which a plurality of kinds are mixed together as necessity, however, it is preferable that the resin dispersing pigment be contained.

As a resin dispersant used in the resin dispersing pigment, polyvinyl alcohols, polyacrylic acid, acrylic acid-acrylonitrile copolymer, a vinyl acetate-acrylic acid ester copolymer, an acrylic acid-acrylic acid ester copolymer, a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, a styrene-maleic acid copolymer, a styrene-maleic anhydride copolymer, a vinyl naphthalene-acrylic acid copolymer, a vinyl naphthalene-maleic acid copolymer, a vinyl acetate-maleic acid ester copolymer, a vinyl acetate-crotonic acid copolymer, a vinyl acetate-acrylic acid copolymer, or the like and a salt thereof are included. Among these, a copolymer of a monomer having a hydrophobic functional group and a monomer having a hydrophilic functional group, and a polymer consisting of monomers having both a hydrophobic functional group and a hydrophilic functional group are preferable. As a form of the copolymer, any form of a random copolymer, a block copolymer, an alternating copolymer, and a graft copolymer can be used.

The content ratio of the resin dispersant can be appropriately selected depending on the pigment to be dispersed, however, is preferably from 5 parts by mass to 200 parts by mass and more preferably from 30 parts by mass to 120 parts by mass, with respect to 100 parts by mass of the content of the pigment in the ink composition.

2.3.3. Water

The ink composition according to the embodiment contains water. Since water which is preferably used is the same as those described in the resin liquid, description thereof will be omitted. The content of water can be set to, for example, 50% by mass or more with respect to the total mass of the ink composition.

2.3.4. Organic Solvent

The ink composition according to the embodiment may contain an organic solvent. The organic solvent is provided with a function of enhancing adhesion properties of the resin liquid to the ink low-absorbing or non-absorbing recording medium described above, suppressing the drying of a head of an ink jet recording apparatus, or the like. As to specific examples of the organic solvent, since the same organic solvents can be used as those exemplified in description of the resin liquid, description thereof will be omitted. The content of the organic solvent is not particularly limited, however, can be set, for example, from 1% by mass to 40% by mass with respect to the total mass of the ink composition.

2.3.5. Surfactant

The ink composition according to the embodiment may contain a surfactant. The surfactant is provided with a function of decreasing the surface tension of the reaction liquid, enhancing wettability to the recording medium, or the like. Among the surfactants, for example, an acetylene glycol-based surfactant, a silicone-based surfactant, and a fluorine-based surfactant can be preferably used. As to specific examples of these surfactants, since the same surfactants can be used as those exemplified in description of the resin liquid, description thereof will be omitted. The content of the surfactant is not particularly limited, however, can be set, for example, from 0.1% by mass to 1.5% by mass with respect to the total mass of the ink composition.

2.3.6. Resin

The ink composition according to the embodiment may contain a resin. The resin can enhance the physical strength such as adhesion properties or the abrasion resistance of the image which is recorded. As to specific examples of the resin, since the same resins can be used as those exemplified in description of the resin liquid, description thereof will be omitted. In a case of containing the resin, the content thereof (the amount converted into a solid content) is preferably from 1% by mass to 10% by mass and more preferably from 1% by mass to 7% by mass, with respect to the total mass of the ink composition.

2.3.7. Other Components

The ink composition according to the embodiment may contain a pH adjusting agent, a preservative and fungicide, a rust inhibitor, a chelating agent, or the like as necessary.

2.3.8. Physical Properties of Ink Composition

As to the ink composition according to the embodiment, the surface tension at 20° C. is preferably from 20 mN/m to 40 mN/m and more preferably from 25 mN/m to 35 mN/m, from a viewpoint of a balance between the image quality and the reliability as an ink for ink jet recording. Moreover, for example, the surface tension can be measured by confirming the surface tension when a platinum plate is wetted with the ink under an environment of 20° C. using an Automatic Surface Tensiometer CBVP-Z (trade name, manufactured by Kyowa Interface Science Co., Ltd.).

In addition, from a similar viewpoint, the viscosity at 20° C. of the ink composition according to the embodiment is preferably from 3 mPa·s to 10 mPa·s and more preferably from 3 mPa·s to 8 mPa·s. Moreover, as to the measurement of the viscosity, for example, the viscosity can be measured under an environment of 20° C. using a viscoelasticity tester MCR-300 (trade name, manufactured by Physica Messtechnik GmbH).

3. RECORDING APPARATUS

Figure 1:
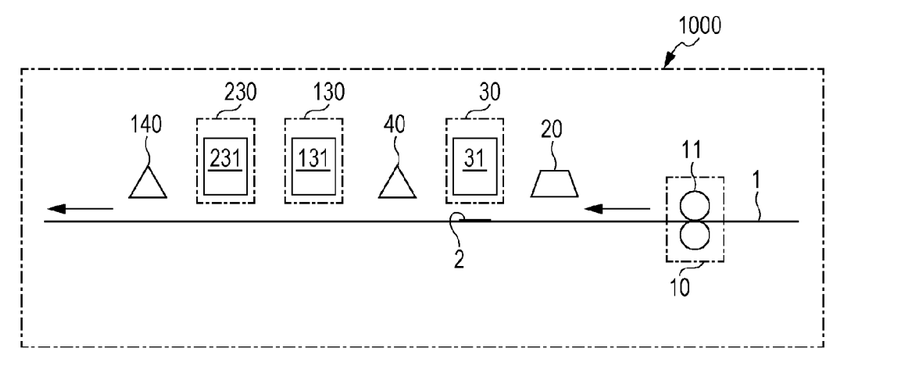
FIG. 1 is a view schematically showing an example of an image recording apparatus used in an image recording method according to the invention.

Description will be given of an example of an image recording apparatus capable of conducting an image recording method according to the embodiment with reference to a drawing. Here, the image recording apparatus which can be used in the image recording method according to the embodiment is not limited to the following aspects. That is, in the following aspects, the image recording apparatus in which all processes are continuously carried out in one line (in-line) is indicated, however, each process may be intermittently carried out without conducting each process in-line.

FIG. 1 is a view schematically showing an image recording apparatus capable of conducting an image recording method according to the invention. An image recording apparatus 1000 according to the embodiment is provided with a transport unit 10 for transporting a recording medium 1, a corona treatment unit 20 for carrying out a corona discharge treatment, a resin liquid adhering unit 30 for adhering a resin liquid to a recording medium, a first drying unit 40 for drying a resin liquid which is adhered, a reaction liquid adhering unit 130 for adhering a resin liquid to a recording medium, an image recording unit 230 for recording an image using an ink composition, and a second drying unit 140 for drying an image.

3.1. Transport Unit

The transport unit 10 can be configured, for example, of a roller 11. The transport unit 10 may have a plurality of rollers 11. In the illustrated example, in the transport direction of the recording medium 1 (indicated by an arrow in the drawing), the transport unit 10 is provided further to the upstream side than the corona treatment unit 20, however, without being limited thereto, the provided position and number are arbitrary as long as it is possible to transport the recording medium 1. The transport unit 10 may be provided with a feeding roll, a feeding tray, a discharge roll, a discharge tray, various types of platens, and the like.

The recording medium 1 transported by the transport unit 10 is transported to a position where a corona discharge treatment is performed on the recording surface by the corona treatment unit 20.

Moreover, in FIG. 1, a case where the recording medium 1 is a continuous body is exemplified, however, even when the recording medium 1 is in cut-form, by appropriately configuring the transport unit 10, it is possible to carry out transport of the recording medium in the above-described manner.

3.2. Corona Treatment Unit

As to the corona treatment unit 20, the corona discharge treatment is carried out with respect to the recording surface of the recording medium 1. The corona treatment unit 20 can be configured of a well-known corona discharge treatment apparatus. The corona discharge treatment by the corona treatment unit 20 is used in the corona treatment process in the surface modifying process describe above. In FIG. 1, an example in which the corona treatment unit 20 is used is shown, however, the corona treatment unit 20 may be changed to a unit in which an atmospheric pressure plasma treatment, a flame treatment, an ultraviolet irradiation treatment, or the like is carried out. In addition, in a case of using only resin liquid adhering unit 30 described below, it is not necessary to provide the corona treatment unit 20.

In a case where all processes in the image recording method are carried out in-line, when the corona treatment process is employed as the surface modifying process, the drying during the surface modifying process becomes unnecessary in comparison with a case of employing the resin liquid adhering process, and thus it is possible to attain the speeding up of recording.

3.3. Resin Liquid Adhering Unit

The resin liquid adhering unit 30 adheres a resin liquid 2 to the recording surface of the recording medium 1 using the resin liquid. The resin liquid adhering unit 30 is provided with an ink jet recording head 31 which is provided with nozzles for ejecting the resin liquid. The resin liquid adhering unit 30 is used in the resin liquid adhering process in the surface modifying process described above.

Examples of a system of ejecting the resin liquid from the nozzles of the ink jet recording head 31 include the following. Specifically, examples include a system of applying a strong electric field between a nozzle and an accelerating electrode placed in front of the nozzle, continuously ejecting the resin liquid in a liquid droplet form from the nozzle, and performing recording by applying a recording information signal to a deflecting electrode while the liquid droplets of the resin liquid are flying between deflecting electrodes, or a system of ejecting according to the recording information signal without biasing the liquid droplets of the resin liquid (electrostatic attraction system), a system of forcibly ejecting the liquid droplets of the resin liquid by applying pressure to the resin liquid through a small pump and mechanically vibrating the nozzle with a crystal oscillator or the like, a system (piezo system) of ejecting the liquid droplets of the resin liquid and recording by adding pressure and a recording information signal on the resin liquid using a piezoelectric element, a system (thermal jet system) of ejecting the liquid droplets of the resin liquid and recording by heating and foaming the resin liquid with a micro electrode according to the recording information signal, and the like are included.

Moreover, in FIG. 1, as the resin liquid adhering unit 30, a case where an ink jet method is used is shown, however, without being limited thereto, and the resin liquid adhering unit 30 may be changed to an aspect in which the method described above (for example, spray coating or roll coating) can be conducted. In addition, in a case of using only corona treatment unit 20, the resin liquid adhering unit 30 may not be provided.

3.4. First Drying Unit

The first drying unit 40 is used for drying the resin liquid 2. The first drying unit 40 is not particularly limited as long as the first drying unit 40 is provided with a configuration which allows the evaporation and dispersion of the liquid medium included in the resin liquid to promote. For example, a unit for applying heat to the recording medium, a unit for blowing a wind into the resin liquid, furthermore, a unit for combining these, and the like are included. Specifically, forced air heating, radiant heating, conduction heating, high frequency drying, microwave drying, or the like is preferably used. As to the image recording apparatus 1000 according to the embodiment, in a case where the drying for the resin liquid is carried out through natural drying, the first drying unit 40 may not be provided. In addition, the first drying unit 40 is provided on the downstream side of the resin liquid adhering unit 30, however, instead of this configuration or in addition to this configuration, the first drying unit 40 may be provided at a position opposed to the resin liquid adhering unit 30.

3.5. Reaction Liquid Adhering Unit

The reaction liquid adhering unit 130 adheres the reaction liquid to a region which is subjected to the surface modification treatment. The reaction liquid adhering unit 130 is provided with an ink jet recording head 131 which is provided with nozzles for ejecting the reaction liquid. Since the system of ejecting the reaction liquid from the nozzles of the ink jet recording head 131 is the same as that of the example described in the resin liquid adhering unit 30, description thereof will be omitted. The reaction liquid adhering unit 130 is used in the reaction liquid adhering process described above.

Moreover, in FIG. 1, as the reaction liquid adhering unit 130, a case where an ink jet method is used is shown, however, without being limited thereto, and the reaction liquid adhering unit 130 may be changed to an aspect in which the method (for example, spray coating or roll coating) described above can be conducted.

The reaction liquid which is adhered to the recording surface may be dried by a drying unit (not shown). Since the available drying unit is the same as that of the example described in the first drying unit 40, description thereof will be omitted. In addition, the unit of drying the reaction liquid which is adhered to the recording surface may be provided at a position opposite to the reaction liquid adhering unit 130, may be provided on the downstream side of the reaction liquid adhering unit 130, or may be provided at both these positions.

3.6. Image Recording Unit

The image recording unit 230 forms the image by adhering the liquid droplets of the ink composition to the region to which the reaction liquid is adhered. The image recording unit 230 is provided with an ink jet recording head 231 which is provided with nozzles for ejecting the ink composition. Since the system of ejecting the ink composition from nozzles of the ink jet recording head 231 is the same as that of the example described in the resin liquid adhering unit 30, description thereof will be omitted. The image recording unit 230 is used in the image recording process described above.

For the image recording unit 230, any of an ink jet recording apparatus provided with a serial type recording head and an ink jet recording apparatus provided with a line type recording head can be used.

The ink jet recording apparatus provided with a serial type recording head is an apparatus which carries out recording by carrying out the scanning (pass) for ejecting the ink composition several times while relatively moving the recording head with respect to the recording medium. Specific examples of the serial type recording head include one in which the recording head is mounted on a carriage which moves in a width direction (a direction intersecting the transport direction of the recording medium) of the recording medium and the liquid droplets are ejected onto the recording medium by moving the recording head with the movement of the carriage.

On the other hand, the ink jet recording apparatus provided with a line type recording head is an apparatus which carries out recording by carrying out the scanning (pass) for ejecting the ink composition once while relatively moving the recording head with respect to the recording medium. Specific examples of the line type recording head include one in which the recording head is formed wider than the width of the recording medium and the liquid droplets are ejected onto the recording medium without moving the recording head.

As to the serial type recording head, since the image is recorded with a plurality of passes, it is possible to ensure the drying time for the liquid droplets ejected by the passes carried out previously until the time of carrying out the last pass. In contrast, as to the line type recording head, since all liquid droplets which are required for recording are adhered to the recording medium with one pass, the drying time for the liquid droplets is short in comparison with a case of using the serial type recording head. Therefore, in a case where the line type recording head is used, printing unevenness easily occurs due to the deterioration of drying properties of the liquid droplets. With respect to such a problem, since it is possible to improve printing unevenness by carrying out the reaction liquid adhering process before the image recording process, the image recording method according the embodiment can be suitably used with respect to the line type recording head.

Usually, in a case where the ink jet recording apparatus provided with the line type recording head is used, when the transport speed of the recording medium is made fast, printing unevenness or the like occurs unless the liquid droplets of the ink adhered to the recording medium are promptly dried, and thus there is a need of increasing a heating temperature in the drying process or enlarging a heating area. With respect to such a problem, since the image recording method according to the embodiment is excellent in improvement effect of printing unevenness, even in a case where the relative movement speed of the recording head to the recording medium, which is 5 m/minute or more and is preferably 10 m/minute or more, is fast, it is possible to record the image excellent in image quality. The upper limit of the movement speed is not limited, however, is preferably 50 m/minute or less.

3.7. Second Drying Unit

The second drying unit 140 dries the image formed on the recording surface. Since the drying unit which can be employed as the second drying unit 140 is the same as that of the example described in the first drying unit 40, description thereof will be omitted. As to the image recording apparatus 1000 according to the embodiment, in a case where the drying for the image is carried out through natural drying, the second drying unit 140 may not be provided. In addition, the second drying unit 140 is provided on the downstream side of the image recording unit 230, however, instead of this configuration or in addition to this configuration, the second drying unit 140 may be provided at a position opposed to the image recording unit 30.

4. EXAMPLES

Hereinafter, further specific description will be given of an embodiment of the invention using Examples, however, the embodiment is not limited only to these Examples.

4.1. Preparation of Resin Liquid

The resin liquid was obtained by mixing and stirring each component so as to be the combination ratio in Table 1. The numerical values in Table 1 indicate all % by mass and ion exchange water was added so that the total mass of the resin liquid becomes 100% by mass. Moreover, in Table 1, the components described by names other than the compound names are as follow.

RESAMINE D-1060 (trade name, manufactured by Dainichiseika Color & Chemicals Mfg. Co., Ltd., water-based urethane emulsion, 40% aqueous solution, Tg: −70° C., particle diameter 130 μm)

BYK-348 (trade name, manufactured by BYK Japan KK., silicone-based surfactant)

Surfynol DF110D (trade name, manufactured by Nissin Chemical Co., Ltd., acetylene glycol-based surfactant, 32% aqueous solution)

TABLE 1

|  | Resin liquid |
| --- | --- |
| RESAMINE D-1060 | 15 |
| 1,2-hexanediol | 5 |
| BYK-348 | 0.5 |
| Surfynol DF110D | 0.2 |
| Propylene glycol | 15 |
| Ion exchange water | Residue |
| Total (% by mass) | 100 |

4.2. Preparation of Reaction Liquid

After each component was mixed and stirred so as to be the combination ratio in Table 2, the reaction liquid was prepared by performing filtration with a 10 μm membrane filter. The numerical values in Table 2 indicate all % by mass and ion exchange water was added so that the total mass of the reaction liquid becomes 100% by mass. Moreover, the kind and the content of the flocculant in Table 2 are shown in Table 4 to Table 6 described below.

TABLE 2

|  | Reaction liquid |
| --- | --- |
| Flocculant | Described in Table 4 to Table 6 |
| 1,2-Hexanediol | 3 |
| Propylene glycol | 20 |
| BYK-348 | 1 |
| Surfynol DF110D | 0.2 |
| Ion exchange water | Residue |
| Total (% by mass) | 100 |

4.3. Preparation of Ink Composition

After each component was mixed and stirred so as to be the combination ratio in Table 3, the ink composition was prepared by performing filtration with a 10 μm membrane filter. When the ink composition was prepared, a pigment dispersing liquid containing a pigment, a resin dispersant, and water was produced in advance and the pigment dispersing liquid was mixed with remaining components. The numerical values in Table 3 indicate all % by mass and ion exchange water was added so that the total mass of the ink composition becomes 100% by mass. Moreover, in Table 3, among the components described by names other than the compound names, the components other than the components used in Table 1 and Table 2 are as follow.

C.I. Pigment Blue 15:3 (cyan pigment)

Resin dispersant (styrene-acrylic acid copolymer, weight average molecular weight 25,000, Tg: 80° C., oxidation 180)

Resin emulsion (styrene-acrylic acid copolymer, weight average molecular weight 50,000, Tg: 80° C., oxidation 130, average particle diameter 75 nm)

TABLE 3

|  | Ink |
| --- | --- |
| C.I. Pigment Blue 15:3 | 4 |
| Resin dispersant | 2 |
| Resin emulsion | 2 |
| 1,2-Hexanediol | 5 |
| BYK-348 | 0.6 |

TABLE 3-continued

| | Ink |
|---|---|
| Surfynol DF110D | 0.2 |
| 2-pyrrolidone | 5 |
| Propylene glycol | 10 |
| Ion exchange water | Residue |
| Total (% by mass) | 100 |

4.4. Evaluation Test

4.4.1. Production of Evaluation Sample

The evaluation samples of Examples and Comparative Examples described in Table 4 to Table 6 produced by combining the following processes. Moreover, in Examples AB1 to AB6 in Table 6, as the surface modifying process, the resin liquid adhering process was conducted after conducting the corona treatment process. In addition, in Table 4 to Table 6, "PAA-01" (trade name) used as a cationic resin is a polyallylamine polymer manufactured by NITTOBO MEDICAL CO., LTD.

In the corona treatment process, the recording surface of the recording medium was treated under a condition in which the amount of corona discharge was 333 W•minute/m² using a corona discharge treatment machine of in-house production.

In the resin liquid adhering process, the resin liquid obtained as described above was applied onto the recording surface of the recording medium using a bar coater so that the mass of the solid content of the resin became 0.24 g/m². Then, the applied resin liquid was heated and dried at 40° C. and it was confirmed that there was no stickiness by a finger touch.

In the reaction liquid adhering process, the reaction liquid obtained as described above was applied onto the recording surface of the recording medium using a bar coater so that the application amount (the mass of the liquid) became 4 g/m². Then, the applied reaction liquid was heated and dried at 40° C. and it was confirmed that there was no stickiness by a finger touch.

In the image recording process, a platen heater was attached to the ink jet printer PX-G930 (trade name, manufactured by Seiko Epson Corporation, nozzle resolution: 180 dpi) to remodel and the printer in which an ink cartridge thereof was filled with the ink composition obtained as described above was used. Then, in a state in which the surface temperature of the recording surface of the recording medium was heated at 40° C., the liquid droplets of the ink composition was adhered to the recording surface of the recording medium to obtain the image. Afterwards, the obtained image was heated and dried at 40° C. and it was confirmed that there was no stickiness by a finger touch. Moreover, in the image recording process, the weight per one liquid droplet of the ink composition was set to 13 ng and the image having an image resolution of 720 dpi×720 dpi was formed.

In addition, in the following evaluation tests, as a recording medium, a polyester film (trade name "PET50A PL Shin", manufactured by Lintec Corporation, in Tables, described by being abbreviated as "PET"), a polypropylene film (trade name "SY51M", manufactured by UPM Raflatac, in Tables, described by being abbreviated as "PP"), and a polyvinyl chloride film (trade name "LLSPEX", manufactured by SAKURAI CO., LTD., in Tables, described by being abbreviated as "PVC").

In addition, in the following evaluation tests, the evaluation of two patterns of a case where the following processes were carried out immediately after finishing the surface modifying process (in Table, described as "Immediately after surface modification") and a case the following processes were carried out after the surface modifying process was finished and one month had passed (in Table, described as "One month after surface modification") was carried out. Moreover, in a case where the surface modifying process is not carried out, "Immediately after the surface modification" means that each process is immediately conducted and "One month after surface modification" means that each process was conducted after the recording medium was left for one month.

In addition, the wetting tension index of the recording surface of the recording medium was measured according to JIS K6768 immediately after the surface modifying process. Moreover, in a case where the surface modifying process was not carried out, before conducting each process, the wetting index of the recording surface was measured.

4.4.2. Line Width (Wetting Spread)

By measuring a line width (rim) of the image recorded on the recording surface, the evaluation of a line width (wetting spread properties) of the ink composition was carried out. The evaluative criteria are as follows.

A: The line width is 70 μm or more (The solid image is filled).

B: The line width is less than 70 μm (The solid image is not filled).

4.4.3. Printing Unevenness

The image recorded on the recording surface of the evaluation sample was visually confirmed and the existence of printing unevenness was determined. The evaluative criteria are as follows.

A: There is no printing unevenness.

B: Printing unevenness can be slightly confirmed.

C: Printing unevenness can be confirmed with the repellence of the ink.

4.4.4. Abrasion Resistance

The evaluation of abrasion resistance was carried out using Gakushin type fastness rubbing tester AB-301 (trade name, manufactured by TESTER SANGYO CO., LTD.). Specifically, the recording surface on which the image was recorded was rubbed back and forth 20 times by applying a load of 500 g with a friction element in which the white cotton cloth (according to JIS L 0803) was installed. Then, the degree of peeling of the image (coating film) on the recording surface was visually observed. The evaluative criteria are as follow.

A: Even rubbing back and forth 10 times or more, the coating film is not peeled.

B: When rubbing back and forth from 5 times to 9 times, the coating film is peeled and the foundation is exposed.

C: When rubbing back and forth from 1 time to 4 times, the coating film is peeled and the foundation is exposed.

4.5. Evaluation Results

The results of the above evaluation tests are shown Table 4 to Table 6.

TABLE 4

|  |  |  | Example | | | | | | Comparative Example | | |
|---|---|---|---|---|---|---|---|---|---|---|---|
|  |  |  | A1 | A2 | A3 | A4 | A5 | A6 | 1 | 2 | 3 |
| Surface modifying process | Corona treatment [Wmin/m$^2$] | | 333 | 333 | 333 | 333 | 333 | 333 | 333 | | |
| | Resin application [g/m$^2$;dry] | | | | | | | | | | |
| Reaction liquid adhering process | Multivalent metal salt | Calcium nitrate tetrahydrate | 1.762 | | | | | | | 1.762 | |
| | | Calcium acetate monohydrate | | 1.47 | | | | | | | |
| | Organic Acid | Succinic acid | | | 1.181 | | | | | | |
| | | Citric acid | | | | 1.921 | | | | | |
| | Cationic surfactant | Benzalkonium chloride | | | | | 3.4 | | | | |
| | Cationic resin | PAA-01 | | | | | | 2 | | | |
| Wetting tension index after surface treatment [mN/m] JIS K6768 | | PET | 41 | 41 | 41 | 41 | 41 | 41 | 41 | 35 | 35 |
| | | PP | 46 | 46 | 46 | 46 | 46 | 46 | 46 | 31 | 31 |
| | | PVC | 50 | 50 | 50 | 50 | 50 | 50 | 50 | 28 | 28 |
| Immediately after surface modification | Line width | PET | A | A | A | A | A | A | C | C | C |
| | | PP | A | A | A | A | A | A | C | C | C |
| | | PVC | A | A | A | A | A | A | C | C | C |
| | Printing unevenness | PET | A | A | B | B | B | B | C | C | C |
| | | PP | A | A | B | B | B | B | C | C | C |
| | | PVC | A | A | B | B | B | B | C | C | C |
| | Abrasion resistance | PET | A | A | A | A | A | A | B | C | C |
| | | PP | B | B | B | B | B | A | B | C | C |
| | | PVC | B | B | B | B | B | A | C | C | C |
| One month after surface modification | Line width | PET | B | B | B | B | B | B | C | C | C |
| | | PP | B | B | B | B | B | B | C | C | C |
| | | PVC | B | B | B | B | B | B | C | C | C |
| | Printing unevenness | PET | B | B | C | C | C | C | C | C | C |
| | | PP | B | B | C | C | C | C | C | C | C |
| | | PVC | B | B | C | C | C | C | C | C | C |
| | Abrasion resistance | PET | B | B | B | B | B | B | C | C | C |
| | | PP | C | C | C | C | C | B | C | C | C |
| | | PVC | C | C | C | C | C | B | C | C | C |

TABLE 5

|  |  |  | Example | | | | | | Comparative Example |
|---|---|---|---|---|---|---|---|---|---|
|  |  |  | B1 | B2 | B3 | B4 | B5 | B6 | 4 |
| Surface modifying process | Corona treatment [Wmin/m$^2$] | | | | | | | | |
| | Resin application [g/m$^2$;dry] | | 0.24 | 0.24 | 0.24 | 0.24 | 0.24 | 0.24 | 0.24 |
| Reaction liquid adhering process | Multivalent metal salt | Calcium nitrate tetrahydrate | 1.762 | | | | | | |
| | | Calcium acetate monohydrate | | 1.47 | | | | | |
| | Organic Acid | Succinic acid | | | 1.181 | | | | |
| | | Citric acid | | | | 1.921 | | | |
| | Cationic surfactant | Benzalkonium chloride | | | | | 3.4 | | |
| | Cationic resin | PAA-01 | | | | | | 2 | |
| Wetting tension index after surface treatment [mN/m] JIS K6768 | | PET | 73 | 73 | 73 | 73 | 73 | 73 | 73 |
| | | PP | 70 | 70 | 70 | 70 | 70 | 70 | 70 |
| | | PVC | 73 | 73 | 73 | 73 | 73 | 73 | 73 |
| Immediately after surface modification | Line width | PET | A | A | A | A | A | A | C |
| | | PP | A | A | A | A | A | A | C |
| | | PVC | A | A | A | A | A | A | C |
| | Printing unevenness | PET | A | A | B | B | B | B | C |
| | | PP | A | A | B | B | B | B | C |
| | | PVC | A | A | B | B | B | B | C |
| | Abrasion resistance | PET | A | A | A | A | A | A | B |
| | | PP | B | B | B | B | B | B | C |
| | | PVC | B | B | B | B | B | B | C |
| One month after surface modification | Line width | PET | A | A | A | A | A | A | C |
| | | PP | A | A | A | A | A | A | C |
| | | PVC | A | A | A | A | A | A | C |
| | Printing unevenness | PET | A | A | B | B | B | B | C |
| | | PP | A | A | B | B | B | B | C |
| | | PVC | A | A | B | B | B | B | C |
| | Abrasion resistance | PET | A | A | A | A | A | A | B |
| | | PP | B | B | B | B | B | B | C |
| | | PVC | B | B | B | B | B | B | C |

TABLE 6

|  |  |  | Example | | | | | | Comparative Example |
|---|---|---|---|---|---|---|---|---|---|
|  |  |  | AB1 | AB2 | AB3 | AB4 | AB5 | AB6 | 5 |
| Surface modifying process | Corona treatment [Wmin/m²] | | 333 | 333 | 333 | 333 | 333 | 333 | 333 |
|  | Resin application [g/m²;dry] | | 0.24 | 0.24 | 0.24 | 0.24 | 0.24 | 0.24 | 0.24 |
| Reaction liquid adhering process | Multivalent metal salt | Calcium nitrate tetrahydrate | 1.762 | | | | | | |
|  |  | Calcium acetate monohydrate | | 1.47 | | | | | |
|  | Organic Acid | Succinic acid | | | 1.181 | | | | |
|  |  | Citric acid | | | | 1.921 | | | |
|  | Cationic surfactant | Benzalkonium chloride | | | | | 3.4 | | |
|  | Cationic resin | PAA-01 | | | | | | 2 | |
| Wetting tension index after surface treatment [mN/m] JIS K6768 | | PET | 73 | 73 | 73 | 73 | 73 | 73 | 73 |
|  |  | PP | 70 | 70 | 70 | 70 | 70 | 70 | 70 |
|  |  | PVC | 73 | 73 | 73 | 73 | 73 | 73 | 73 |
| Immediately after surface modification | Line width | PET | A | A | A | A | A | A | C |
|  |  | PP | A | A | A | A | A | A | C |
|  |  | PVC | A | A | A | A | A | A | C |
|  | Printing unevenness | PET | A | A | B | B | B | B | C |
|  |  | PP | A | A | B | B | B | B | C |
|  |  | PVC | A | A | B | B | B | B | C |
|  | Abrasion resistance | PET | A | A | A | A | A | A | B |
|  |  | PP | A | A | A | A | A | A | B |
|  |  | PVC | A | A | A | A | A | A | B |
| One month after surface modification | Line width | PET | A | A | A | A | A | A | C |
|  |  | PP | A | A | A | A | A | A | C |
|  |  | PVC | A | A | A | A | A | A | C |
|  | Printing unevenness | PET | A | A | B | B | B | B | C |
|  |  | PP | A | A | B | B | B | B | C |
|  |  | PVC | A | A | B | B | B | B | C |
|  | Abrasion resistance | PET | A | A | A | A | A | A | B |
|  |  | PP | A | A | A | A | A | A | B |
|  |  | PVC | A | A | A | A | A | A | B |

Examples A1 to A6 in Table 4 are examples in which, as the surface modifying process, only corona treatment process was carried out. From the evaluation results of Examples A1 to A6, it was indicated that in a case where the reaction liquid adhering process was carried out immediately after the surface modification, the line width, printing unevenness, and the abrasion resistance of the image were excellent. Moreover, when the reaction liquid adhering process was carried out after one month had passed from the corona treatment process, there was a tendency that an effect of the corona treatment was deteriorated and the line width, printing unevenness, and the abrasion resistance of the image were deteriorated.

Comparative Example 1 in Table 4 was set in the same manner as Examples A1 to A6, except not carrying out the reaction liquid adhering process. From the evaluation results of Comparative Example 1, it was indicated that when the reaction liquid adhering process was not carried out, the line width, printing unevenness, and the abrasion resistance of the image was deteriorated.

Comparative Example 2 in Table 4 was set in the same manner as Examples A1 to A6, except not carrying out the corona treatment. From the evaluation results of Comparative Example 2, it was indicated that when the surface modifying process was not carried out, the line width, printing unevenness, and the abrasion resistance of the image was deteriorated. Moreover, in Comparative Example 2, the trend in which the reaction liquid was repelled on the recording medium at the reaction liquid adhering process was seen and the flocculant was non-uniformly adhered. Therefore, the ink composition could not uniformly react on the recording medium, and thus it is presumed that the evaluation of printing unevenness or the like was degraded.

Comparative Example 3 in Table 4 was set in the same manner as Examples A1 to A6, except not carrying out the corona treatment and the reaction liquid adhering process. From the evaluation results of Comparative Example 3, it was indicated that when the surface modifying process was not carried out, the line width, printing unevenness, and the abrasion resistance of the image was significantly deteriorated.

Examples B1 to B6 in Table 5 are examples in which, as the surface modifying process, only resin liquid adhering process was carried out. From the evaluation results of Examples B1 to B6, it was indicated that in a case where the reaction liquid adhering process was carried out immediately after the surface modification, the line width, printing unevenness, and the abrasion resistance of the image were excellent. Since an effect of enhancing the wetting index by the resin liquid adhering process was excellent in comparison with an effect by the corona treatment process, the evaluation results by the resin liquid adhering process were also excellent in comparison with those of the corona treatment process. In addition, even when the reaction liquid adhering process was carried out after one month had passed from the resin liquid adhering process, it was indicated that an effect of the resin liquid could be sufficiently maintained.

Comparative Example 4 in Table 5 was set in the same manner as Examples B1 to B6, except not carrying out the reaction liquid adhering process. From the evaluation results of Comparative Example 4, it was indicated that when the reaction liquid adhering process was not carried out, the line width, printing unevenness, and the abrasion resistance of the image was deteriorated.

Examples AB1 to AB6 in Table 6 are examples in which, as the surface modifying process, the corona treatment process and the resin liquid adhering process was carried out in this order. From the evaluation results of Examples AB1 to AB6, it was indicated that in a case where the reaction liquid adhering process was carried out immediately after the surface modification, the line width, printing unevenness, and the abrasion resistance of the image were extremely excellent. In addition, when the corona treatment process and the reaction liquid adhering process were carried out in this order, it was found that the abrasion resistance was significantly enhanced due to enhancing the fixing properties of the resin liquid. In addition, it was indicated that even when the reaction liquid adhering process was carried out after one month had passed from the surface modifying process, an effect of the surface modifying process could be sufficiently maintained.

Moreover, when each process was conducted under the same conditions as those of Examples described above except setting the relative movement speed of the recording head to the recording medium to 5 m/minute using the image recording apparatus in which the recording head in FIG. 1 described above was set to the line type recording head (not shown in Table 4 to Table 6), it was possible to carry out excellent recording in the same manner. In a case of the image recording apparatus in which the recording head is set to the line type recording head, although there is an advantage in which the recording speed is fast, there is a tendency of deteriorating printing unevenness due to adhering all ink composition which is required for recording to the recording medium with one pass, however, since it is possible to record the recorded matter having excellent quality by using the image recording method according to the embodiment, the embodiment is particularly useful in a case of using the image recording apparatus in which the recording speed is fast.

Furthermore, in a case where the application amount of the resin of the resin liquid in the surface modifying process was a less application amount in the range of the application amount of the resin described above, it was found that drying properties of the resin liquid was more excellent and it was also possible to ensure a surface modifying effect. In addition, in a case where the adhesion amount of the flocculant in the reaction liquid adhering process is a less adhesion amount in the range of the adhesion amount of the flocculant described above, it was found that reducing properties of stickiness or odor caused by the flocculant is more excellent and the image quality was excellent.

The invention is not limited to the embodiments described above and various modifications are possible. For example, the invention includes configurations which are substantially the same as the configurations described in the embodiments (for example, configurations having the same function, method and results, or configurations having the same purpose and effect). In addition, the invention includes configurations in which non-essential parts of the configurations described in the embodiments are replaced. In addition, the invention includes configurations exhibiting the same operation and effect as the configurations described in the embodiments or configurations capable of achieving the same object. In addition, the invention includes configurations in which known techniques were added to the configurations described in the embodiments.

The entire disclosure of Japanese Patent Application No. 2013-266916, filed Dec. 25, 2013 and 2014-143104, filed Jul. 11, 2014 are expressly incorporated by reference herein.

What is claimed is:

1. An image recording method comprising:
   modifying a surface to set a wetting tension index of a recording surface to 40 mN/m or more by carrying out a surface modification of the recording surface of an ink low-absorbing or non-absorbing recording medium;
   adhering a reaction liquid containing a flocculant to the recording surface after the modifying of the surface; and
   recording an image on the recording surface using an ink composition for ink jet recording containing a color material and water after the adhering of the reaction liquid.

2. The image recording method according to claim 1, wherein the surface modification of the recording surface in the modifying of the surface is carried out by at least one of performing a corona treatment on the recording surface and adhering a resin liquid containing a resin to the recording surface.

3. The image recording method according to claim 2, wherein the surface modification of the recording surface in the modifying of the surface is conducted by carrying out the performing of the corona treatment and the adhering of the resin liquid in this order.

4. The image recording method according to claim 2, wherein the resin included in the resin liquid includes a resin in which the glass transition temperature is 50° C. or lower.

5. The image recording method according to claim 2, wherein the resin included in the resin liquid includes at least one kind selected from a group consisting of a urethane resin, a (meth)acrylic resin, a styrene-(meth) acrylic resin, and a polyolefin resin.

6. The image recording method according to claim 1, wherein the adhering of the reaction liquid is conducted within 10 days after the modifying of the surface is carried out.

7. The image recording method according to claim 1, wherein the flocculant included in the reaction liquid is at least one kind selected from a multivalent metal salt and an organic acid.

8. The image recording method according to claim 1, wherein the color material included in the ink composition is a pigment, and
   wherein the ink composition further contains a resin dispersant which disperses the pigment.

9. The image recording method according to claim 1, wherein the recording medium is an ink non-absorbing recording medium.

10. The image recording method according to claim 1, wherein the recording of the image is carried out using an ink jet recording apparatus provided with a recording head which ejects liquid droplets of the ink composition, and
    wherein the ink jet recording apparatus is an ink jet recording apparatus provided with a line type recording head for carrying out recording of an image by carrying out scanning once in which the ink composition is ejected while the recording head relatively moves with respect to the recording medium.

11. The image recording method according to claim 10, wherein, in scanning in which the ink composition is ejected while the recording head relatively moves with respect to the recording medium, a relative moving speed of the recording head to the recording medium is 5 m/minute or more.

* * * * *